Aug. 14, 1956 G. A. BRACE 2,758,668
SUCTION CLEANERS
Filed Jan. 7, 1954 3 Sheets-Sheet 1

Aug. 14, 1956 G. A. BRACE 2,758,668
SUCTION CLEANERS
Filed Jan. 7, 1954 3 Sheets-Sheet 2

Aug. 14, 1956  G. A. BRACE  2,758,668
SUCTION CLEANERS

Filed Jan. 7, 1954  3 Sheets-Sheet 3

United States Patent Office 2,758,668
Patented Aug. 14, 1956

2,758,668

SUCTION CLEANERS

George A. Brace, Highland Park, Ill., assignor to The Hoover Company, North Canton, Ohio, a corporation of Ohio Application January 7, 1954, Serial No. 402,718

7 Claims. (Cl. 183—37)

This invention relates to suction cleaners and more particularly to novel means by which a disposable paper filter can be installed within the cleaner and sealed to the air inlet tube thereof by a unique pressure responsive gasket member.

Thus, it is one of the objects of the invention to provide a suction cleaner with a combined filter positioning and clamping means so designed as to hold the portion of the filter bag surrounding the air inlet opening taut and juxtaposed to a flexible diaphragm surrounding the cleaner air inlet passage. The arrangement is such that the filter side of the diaphragm is exposed to a lower pressure than the opposite side when the cleaner is operating with the result that the diaphragm is held firmly against the filter by differential pressure and forms an effective air seal between the cleaner inlet passage and the filter inlet without the necessity for a mechanical coupling of any kind. Hence, it will be apparent that the invention avoids the use of a great array of clamping devices heretofore proposed and requiring some form of telescoping coupling device with means for securing the walls of the filter thereto in some manner. These prior devices are not only complex structurally but are bulky, difficult to manipulate and oftentimes uncertain and ineffective in operation. Other prior art filter couplings require a complex filter construction, as for example, a filter with a cardboard end wall having an opening through which the air inlet conduit must be inserted and sealed thereto as by rubber valves built into each filter bag.

The present invention avoids the need for such costly and complex filter bags as well as any form of telescoping coupling connection with the filter bag. Furthermore, the present invention provides a simple arrangement by which the filter can be assembled to the cleaner merely by dropping the filter bag into the filter chamber and closing the end cap.

Accordingly, it is a primary object of this invention to provide a suction cleaner with novel means for holding a filter bag assembled thereto and making use of pressure responsive means to form an air tight seal between the filter inlet and the cleaner air inlet passage.

Another object is the provision of a suction cleaner with a pressure responsive sealing gasket responsive to a subatmospheric pressure on one face thereof to form an airtight seal between the rim of the filter inlet and the cleaner air inlet passage.

Yet another object is the provision of a filter mounting facility and an air inlet coupling therefor supported independently of one another and making use of differential pressures to hold a sealing gasket in airtight engagement with the rim of the filter inlet so long as the cleaner is operating.

Numerous other objects and advantages of the invention will become apparent from the following detailed specification of illustrative embodiments of the invention taken in connection with the accompanying drawings, wherein.

Figure 1:
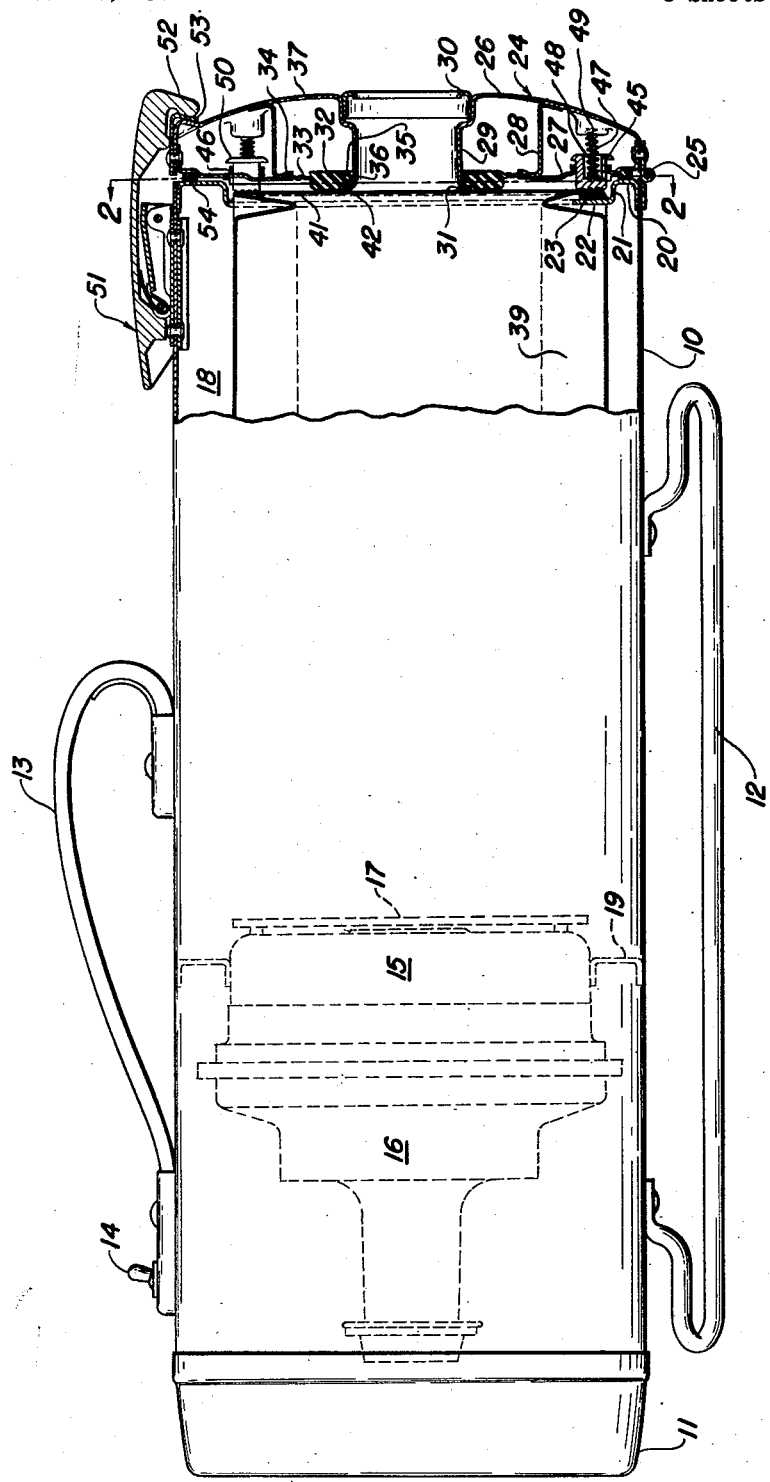
Figure 1 is a side elevational view partly in section of a tank type suction cleaner incorporating the invention and showing the position of the sealing diaphragm when the motor-fan unit is energized.
Figure 2:
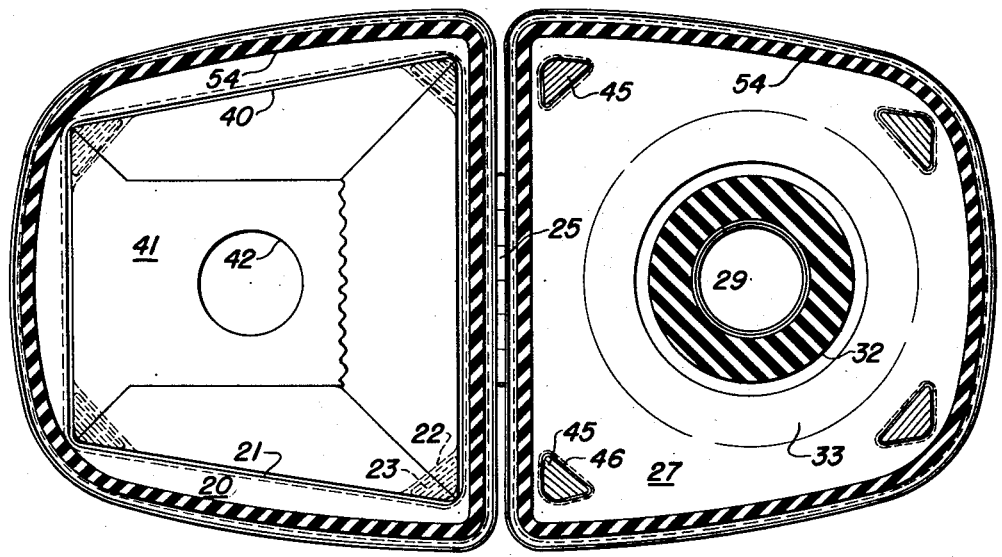
Figure 2 is an end view of the filter chamber with the end cap in open position and taken along the line 2—2 of Figure 1.

As depicted in Figures 1 and 2, the cleaner comprises a tubular main casing closed at its rear end by an end cap 11 and supported on a pair of skids 12. Extending along the top side is a carrying handle 13 at one end of which is a toggle type control switch 14 for the motor-fan unit of a conventional type and including a multiple stage suction fan 15 and an electric driving motor 16. This unit is supported within the rear end of the casing in any suitable manner with the suction fan inlet 17 opening into the filter chamber compartment 18 occupying the forward and remaining portion of the casing. It will, of course, be understood that the air entering inlet 17 is discharged from the periphery of the fan rearwardly of supporting partition 19 and flowing over the motor to cool the same as it passes to an outlet opening located in the end wall of cap 11.

Supported at the rim of the forward inlet end of the casing 10 is a filter mounting ring 20 having an inwardly projecting flange 21 defining a filter bag receiving opening of any desired shape. As herein shown, flange 21 defines an inlet opening of trapezoidal shape corresponding generally to the cross sectional shape of casing 10 and adapted to receive a filter bag of similar shape. As best shown in Figure 2, the corners of the inner rim edges of flange 21 are bridged by triangular shaped filter supporting shelves 22. Secured to the outer face of each of the shelves is a resilient rubber pad 23 having corrugations therein which mate with similar corrugations in rubber clamping members carried by the end cap. Since shelves 22 and pads 23 are located in a plane spaced inwardly from the outer face of mounting ring 20, it will be apparent that flanges 21 provide a means for guiding the peripheral edges of a filter bag end wall into place as it is dropped into the filter chamber in a manner which will be described presently.

While various arrangements may be used to cooperate with pads 23 in gripping the corners of the filter end wall and holding it taut opposite a wall of the cleaner filter chamber, the drawing shows the movable portion of the filter clamp carried by an end cap 24 hinged to the rim of the cleaner casing at 25. The end cap includes an outer wall 26 and an inner wall 27 joined at their rims and held in spaced-apart relation by an imperforate annular partition 28. This partition cooperates with the end cap walls to seal the compartments on either side of the partition from one another. A combined air inlet conduit and suction hose socket 29 extends through the end cap and includes a detent ring 30 which is engageable with a pin carried by the hose to hold the latter detachably coupled to the socket. The inner end of socket 29 terminates slightly outwardly of the plane of filter seating pads 23 and includes an outwardly flared flange 31.

The pressure responsive sealing gasket or diaphragm for the filter inlet includes a soft rubber ring 32 having an annular corrugated web 33 projecting laterally from the outer rim thereof. This is suitably clamped between the rim of an opening in wall 27 of the end cap and a circular flange 34. As shown in Figure 1, ring 32 is not secured to hose socket 29 but is free for limited movement along the outer wall thereof. A metal ring 35 secured to the rim of the opening in pad 32 provides sufficient reinforcing to prevent accidental movement of the pad inwardly past flange 31 of the socket. When the cleaner is operating, the sealing gasket lies in the position shown in Figure 1. As soon as the suction fan unit is energized, the pressure within filter chamber 18 will be greatly reduced causing the sealing gasket to move inwardly until its inner rim 36 is compressed against flange 31 of the hose socket. Preferably the outer wall of the end cap is provided with a vent 37 to the atmosphere so that the full pressure differential developed by the suction fan unit is applied to the opposite sides of the sealing gasket and is effective to hold the same against the taut bottom of the filter bag in a manner which will become clearer presently.

Figure 4:
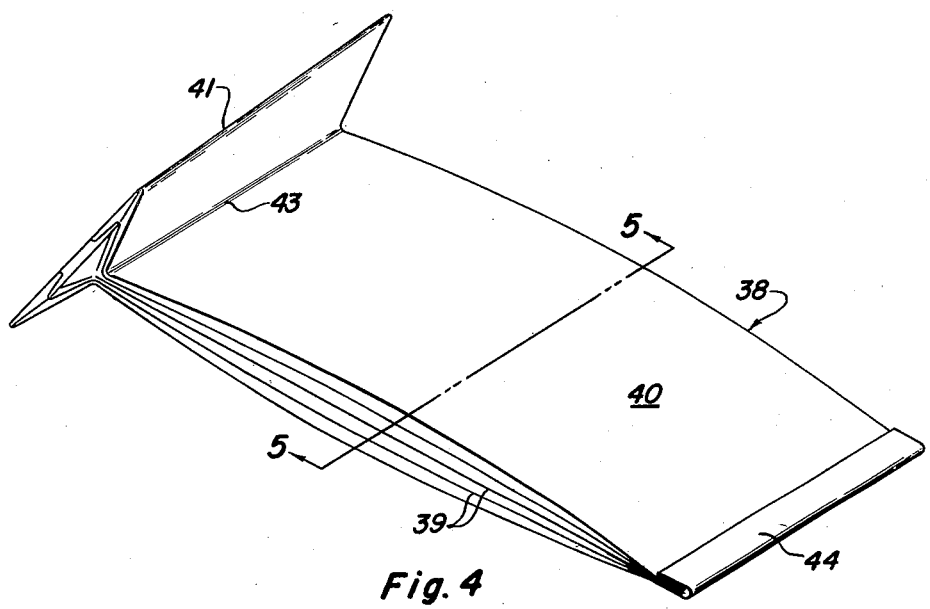
Figure 4 is an isometric view of the filter bag partially unfolded and ready for assembly to the cleaner.
Figure 5:
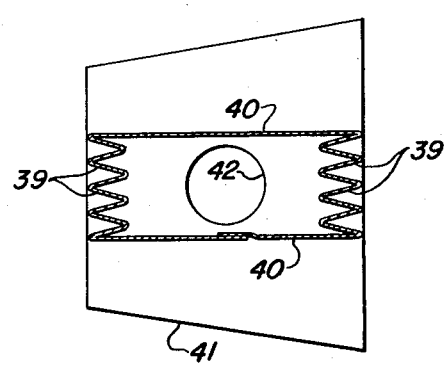
Figure 5 is a sectional view of the filter bag taken along line 5—5 of Figure 4.

While the throw-away, non-reusable paper filter bag may take various forms, a particularly desirable and convenient construction is illustrated in Figures 4 and 5. This filter is manufactured from a single piece of rectangularly shaped air pervious filter material. The longer edges of the blank are sealed together to form a tube. This tube is then creased to provide one or more inwardly extending pleats 39 extending lengthwise of the opposite sides thereof interconnected by wide flat webs 40. Both the webs and the pleated walls at one end of the tube are folded inwardly in overlapping relation and sealed to form a flat end wall 41 having a small diameter air inlet opening 42. The filter bag illustrated in the drawing is so folded that end wall 41 is of trapezoidal shape and has a perimeter slightly less than the inner perimeter of flange 21 of mounting ring 20. As a result, end wall 41 will drop readily into place on supporting shelves 22 as it is being assembled within the cleaner. It will be appreciated that the filter may be formed with a square, rectangular, circular or other shaped end wall.

Figure 3:
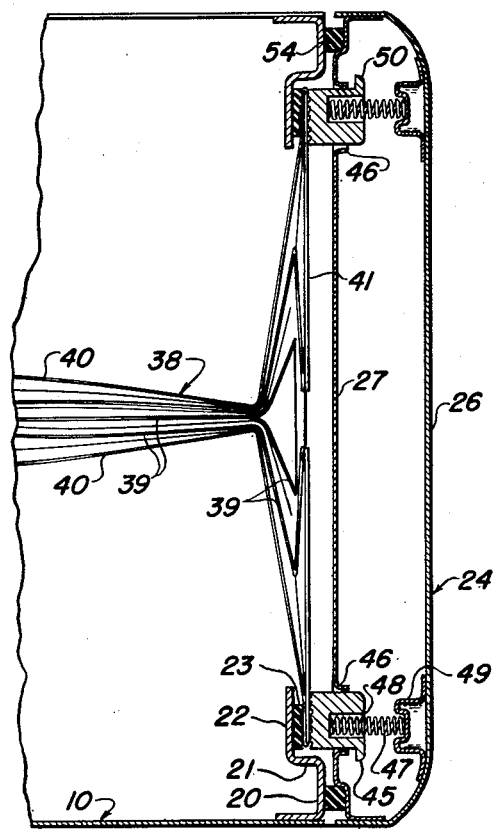
Figure 3 is a fragmentary sectional view through the filter clamping means and showing a newly installed filter before the same is inflated.

When the filter is formed in the manner described above with the inner end overturned and sealed against the side wall as indicated at 44, it will be apparent that the pleated main body of the bag can be collapsed to a substantially flat condition as indicated in Figures 3 and 4. The flat end wall 41 of the bag can also be folded along crease line 43 so that it will lie flush against the adjacent flat side wall 40 of the bag for compact packaging. When so folded it will be observed that the portions of walls 40 opposite the corners of end wall 41 will lie flush against the end of the bag. And this is true even when the end is unfolded so as to lie normal to the collapsed main body of the bag. This is made particularly clear in Figure 3, showing a newly installed, uninflated filter bag clamped in place in the filter chamber.

The simple means for clamping the filter in operating position within the cleaner will now be described by reference to Figures 1, 2 and 3. The movable portion of the clamping means comprises a plurality of triangular shaped clamping members 45, reciprocally supported in guide thimbles 46 carried by inner wall 27 of the end cap. When the end cap is closed, clamping members 45 overlie pads 23 carried by the filter supporting shelves 22. The inner ends of the clamping members are corrugated to cooperate with the corrugations of pads 23 to grip the corners of the filter bag more firmly and to prevent the end wall 41 from being pulled inwardly toward the longitudinal axis of the filter chamber. Members 45 are urged inwardly by compression spring 47 having one end seated in wells 48 and the other end bearing against sockets 49 on the inner face of end cap wall 26. Flanges 50 of the clamping members cooperate with the rim of thimbles 46 in holding the clamping feet assembled to the end cap.

The end cap is held closed by a conventional toggle clamp 51 pivotally connected to the upper side of the filter chamber and having a hook 52 engageable over a clamping detent clip 53 secured to the upper rim of the end cap. Secured to the inner rim of the end cap is the usual resilient gasket 54 which seats against ring 20 to form an airtight seal therewith when the end cap is closed.

Operation

To install a new filter bag, it is preferable and more convenient to upend the cleaner onto rear end cap 11. Toggle clamp 51 is then opened to release the end cap so that it can be swung to one side of the cleaner casing as shown in Figure 2. A new filter bag is taken from the shipping carton and the flat end wall 41 is swung 90 degrees about crease line 43 so as to lie normal to the collapsed main body of the bag. The operator grasps one edge of the trapezoidal end wall, orients the bag to correspond with position of the similarly shaped supporting ring and drops the bag vertically into the filter chamber with corners resting on padded shelves 22. The operator then swings the end cap closed and latches it by closing toggle clamp 51. As the end cap closes the pair of clamping feet 45 adjacent hinge 25 come into contact with the adjacent underlying corners of the filter bag and clamp them firmly against pads 23. As the end cap closes further, the upper pair of clamping feet 45 engage the upper corners of the bag in a similar manner and clamp them positively in place. End wall 41 then lies substantially flush with the flanged inner end 31 of the hose coupling. The pressure responsive sealing pad 32 may or may not contact the bottom of the bag at this time since its normal position while the cleaner is de-energized is preferably closely adjacent but slightly spaced from the bottom of the bag so as not to apply any pressure thereto during the clamping operation. As the assembly operation is completed the filter will be collapsed as best shown in Figure 3.

The cleaner is now ready for operation. When motor switch 14 is closed, the suction created by fan 16 will quickly inflate the filter bag to its full size. If only a single pleat is placed in each of the opposite walls of the bag, these will open to lie substantially at right angles to webs 40. However, if there are multiple pleats in the side edges of the bag, as shown in the drawing, these will open only partially as indicated in Figure 1, and will provide increased filtering area. As soon as the fan begins lowering the pressure in the filter chamber, this subatmospheric pressure will be acting against the inner side of sealing gasket 32 and diaphragm 33 while atmospheric pressure will be acting against the opposite outer side of the gasket. Accordingly, this pressure differential will pull the gasket inwardly into airtight engagement with the bottom of the filter bag and particularly in the rim area of air inlet opening 42. The inner rim edge 36 of the sealing gasket will also be pulled downwardly into tight sealing engagement with the flanged end 31 of the hose socket. The usual suction hose and cleaning tools may now be connected to socket 29 and the cleaner placed in operation.

After the filter bag becomes filled with dirt, it can be replaced with a new filter most expeditiously. The operator merely detaches the suction hose, upends the cleaner onto end cap 11 and releases toggle clamp 51 so that the end cap and clamping members 45 carried thereby can be swung open. It is now a simple matter to lift the dirty filter from the cleaner and to replace it with a new one in the manner described above.

Figure 6:
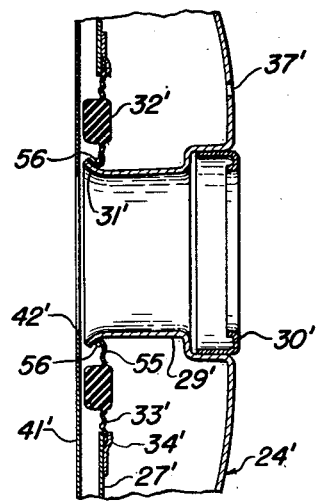
Figure 6 is a fragmentary sectional view through an end cap showing an alternate form of pressure responsive sealing diaphragm.

Figure 6 shows an alternate construction in which the pressure responsive resilient sealing gasket 32' has its inner rim 55 secured to the periphery of hose socket 29' as by clamping ring 56. The outer flexible ring 33' has its edge clamped to inner wall 27' of the end cap by a metal ring 34'. It will, of course, be obvious that this type of pressure responsive gasket functions in the same manner as the first described embodiment to form an airtight seal with the bottom of the filter bag so long as the cleaner is in operation.

While each form of my sealing gasket is shown as including a relatively thick and resilient circular pad which is pulled into seating contact with the bottom of the filter bag, it will be obvious that these pads are not essential and that a simple flexible diaphragm of uniform thickness may be employed. Various other changes in the construction, design and arrangement of parts will also be recognized as coming within the scope and principles of this invention.

While I have shown and described but two embodiments of my invention, it is to be understood that these embodiments are to be taken as illustrative only and not in a limiting sense. I do not wish to be limited to the particular structures shown and described but to include all equivalent variations except as limited by the scope of the claims.

I claim:

1. In combination, a suction cleaner having a casing housing a motor-fan suction unit therein and providing a filter chamber having a large area access opening, a pervious paper filter bag, means within said filter chamber for supporting said filter bag therein with one wall thereof closely adjacent a wall of said chamber, said one wall including a dirty air inlet opening radially spaced inwardly from said filter supporting means, said filter chamber having an air inlet conduit therethrough in alignment with said filter inlet opening, a resilient pressure responsive sealing gasket means carried by said filter chamber wall and closely surrounding said air inlet conduit, means providing communication between one side of said gasket means and said filter chamber outside of said filter bag whereby one side of said gasket is exposed to the interior of said filter chamber outside of said filter bag so that it is subject to the low pressure prevailing therein when said motor fan suction unit is operating, and means for subjecting the other side of said gasket to a pressure higher than the low pressure in said filter chamber whereby the pressure differential is effective to move said gasket into airtight sealing engagement with the juxtaposed wall of said filter bag to provide a seal between said air inlet conduit and the rim of the inlet opening in said filter bag.

2. In combination, a suction cleaner having a casing housing a motor-fan suction unit and forming a filter chamber, an air inlet conduit extending through a wall of said filter chamber, a paper filter bag having an air inlet opening, filter supporting means within said filter chamber spaced radially outwardly from said air inlet conduit for supporting a wall of said paper filter bag with said inlet opening close to and in alignment with the inner end of said air inlet conduit, a resilient sealing diaphragm surrounding the inner end of said air inlet conduit operable when said motor-fan unit is energized to abut the wall of said filter bag to form an airtight seal therewith about said inlet opening therein, means providing communication between the interior of said filter chamber outside of said filter bag and the inner side of said diaphragm whereby the inner side of said diaphragm is subjected to the low pressure produced by said suction fan outside of said filter bag and means for subjecting the opposite outer side of said diaphragm to a higher pressure whereby the pressure differential is effective to move said sealing diaphragm into airtight sealing engagement with the rim of said filter inlet when said cleaner is in operation.

3. In combination with a tank type suction cleaner having a casing enclosing a motor driven suction fan and forming a filter chamber, said filter chamber having a normally closed large area opening through which a filter bag can be installed and an air inlet tube spaced radially inwardly from the edge of said opening, a filter bag having an air inlet opening, means within said chamber for supporting said filter bag with one wall thereof held closely adjacent a wall of said filter chamber with said air inlet opening in alignment with said air inlet tube, said air inlet tube being adapted to discharge air into said filter bag through said inlet opening, a pressure responsive sealing gasket supported within said casing and surrounding the inner end of said air inlet tube outside of said inlet opening, said gasket having its outer wall exposed to substantially atmospheric pressure and means providing communication between the inner wall of said gasket and said filter chamber outside of said filter bag whereby its inner wall is exposed to the interior of said filter chamber outside of said filter bag and the pressure differential on the opposite sides of said gasket when said suction fan is operating is effective to maintain said gasket in airtight engagement with said one wall of said filter bag about said inlet opening.

4. In combination with the filter chamber of a suction cleaner, suction creating means having an inlet in communication with the interior of said chamber, an air inlet conduit extending through a wall of said chamber for conducting dirt laden air thereinto, a filter bag having an inlet opening in one wall thereof, means spaced radially outwardly from said air inlet conduit for releasably supporting said filter bag in said chamber with said inlet opening extending across and closely adjacent the inner end of said air inlet conduit, differential pressure responsive means operatively associated with said air inlet conduit and supported by said filter chamber for forming an airtight coupling between the filter bag inlet opening and said air inlet conduit, means providing communication between one side of said pressure responsive means and the interior of said filter chamber outside of said filter bag whereby one side of said pressure responsive means is exposed to the interior of said filter chamber outside of said filter bag and in communication with the inlet of said suction creating means, and means for exposing the other side of said pressure responsive means to a higher pressure whereby said pressure responsive means is held in firm contact with the wall of the filter in the area surrounding the inlet opening thereof so long as said suction creating means is operating.

5. In combination, a tank type suction cleaner having a casing housing a suction creating means and forming a filter chamber, a large area opening through the wall of said chamber, a closure member normally closing said opening, a paper filter bag having an inlet opening in one wall thereof, cooperative clamping means carried in part by said filter chamber casing and in part by said closure member for supporting said paper filter bag in said chamber with said air inlet opening in closely spaced relation to the inner wall of said closure member, said closure member having an air inlet passage therethrough in alignment with said inlet opening, and a resilient diaphragm carried on the inner side of said closure member in the area surrounding said inlet passage, means providing communication between the inner side of said diaphragm and the interior of said chamber outside of said filter bag, said diaphragm being pressure responsive to the lowering of the pressure in said filter chamber outside of said filter bag by the operation of said suction creating means to move said diaphragm into airtight sealing engagement with the wall of said filter bag around said inlet opening.

6. A filter chamber for a suction cleaner and having a large filter assembly opening through a wall thereof, a closure member for said opening hinged to said chamber for pivotal movement toward and away from said opening, means for normally locking said closure member closed, a filter supporting ring mounted inwardly of said filter assembly opening and having filter supporting shelves thereon, a throw-away paper filter bag having a flat end wall adapted to overlie said shelves and to be supported thereby, clamping members carried by said closure member opposite said shelves and cooperating therewith to clamp the end wall of said filter in place thereagainst, said closure member having an air inlet passage therethrough radially spaced inwardly from said shelves and terminating adjacent to the end wall of said filter and in alignment with an inlet opening therein, a resilient diaphragm supported by said closure member surrounding the inner end of said air inlet passage, means providing communication between the inner surface of said diaphragm and the interior of said filter chamber outside of said filter bag, means exposing the opposite side of said diaphragm to atmospheric pressure, and suction creating means connected to said filter chamber and operative to draw dirt laden air into said filter bag and to cause said resilient diaphragm to seat against the end wall of said filter bag to form an airtight seal therewith at the junction of said air inlet passage and the inlet opening in said filter bag.

7. In a suction cleaner filter chamber for enclosing a dirt filtering bag, an air pervious paper filter bag housed within said chamber and having an air inlet opening through a wall thereof, said filter chamber having an air inlet passage extending through a wall thereof, means radially spaced outwardly of said inlet passage for supporting said filter in said chamber with said air inlet opening in alignment with and closely adjacent the inner end of the air inlet passage to said filter chamber, a flexible resilient ring of impervious material supported within said casing surrounding the inner end of said air inlet passage having its inner side supported closely adjacent the wall of said filter and its opposite side exposed to atmospheric pressure, means providing communication between the inner side of said ring and the interior of said chamber on the exterior side of said filter bag, said resilient ring having an opening in alignment with said inlet passage and inlet opening and being responsive to a suction pressure applied to the interior of said filter chamber on the exterior of said filter bag to move into airtight contact with the exterior of said filter bag wall and to form an airtight coupling between said filter inlet opening and said filter chamber air inlet passage.

References Cited in the file of this patent

UNITED STATES PATENTS

| | | |
|---|---|---|
| 2,153,580 | Lynger | Apr. 11, 1939 |
| 2,571,125 | Ferraris | Oct. 16, 1951 |
| 2,580,645 | Doughman | Jan. 1, 1952 |
| 2,642,061 | Boyer | June 16, 1953 |
| 2,661,078 | Vance | Dec. 1, 1953 |